Dec. 30, 1924. 1,520,811
D. I. DAVIS
METHOD OF FREEZING AND PRESERVING PERISHABLE PRODUCTS
Filed Feb. 2, 1923  2 Sheets-Sheet 1

Inventor
David I. Davis
Bennett Brunnan
Attorneys

Dec. 30, 1924.  1,520,811
D. I. DAVIS
METHOD OF FREEZING AND PRESERVING PERISHABLE PRODUCTS
Filed Feb. 2, 1923   2 Sheets-Sheet 2
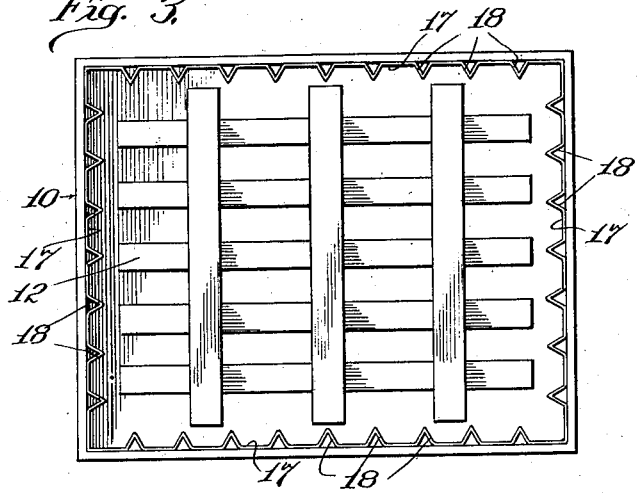
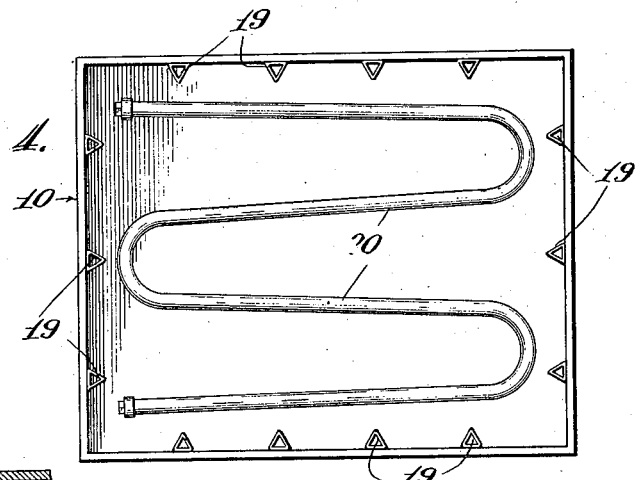
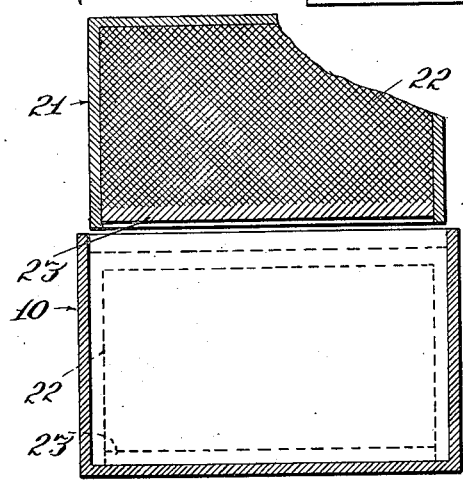
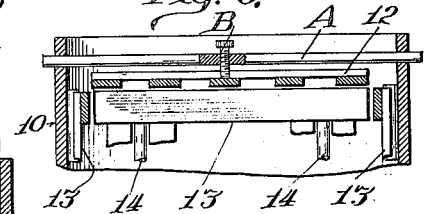

Patented Dec. 30, 1924.

1,520,811

UNITED STATES PATENT OFFICE.

DAVID I. DAVIS, OF CHICAGO, ILLINOIS.

METHOD OF FREEZING AND PRESERVING PERISHABLE PRODUCTS.

Application filed February 2, 1923. Serial No. 616,515.

*To all whom it may concern:*

Be it known that I, DAVID I. DAVIS, a citizen of the United States, residing at Chicago, in the county of Cook and State of Illinois, have invented certain new and useful Improvements in Methods of Freezing and Preserving Perishable Products, of which the following is a specification.

My invention relates to a new and improved method of preserving perishable products.

It is the principal object of my invention to improve the methods in the matter of preparing and storing perishable products, and particularly food stuffs, whereby the material to be preserved shall be prepared and maintained in storage at a minimum cost consistent with a high degree of perfection in the results attained from the standpoint of possible deterioration in taste, color, and other variable qualities.

The method of storing now extensively in vogue, by which the products are air cooled and frozen by being placed in a refrigerated chamber in which the temperature is maintained in a range from 20 degrees below zero to 30 degrees above zero Fahrenheit, is a costly method for a number of reasons.

It requires a considerable period of time to produce the initial freezing of the products with a consequent necessity for the use of expensive equipment and much space. When products are frozen in packages such as tierces considerable amount of capital is tied up in the cost of the packages. Moreover, the use of the packages also increases the size of the space necessary for the freezing operation and the quantity of space necessary later for the storage of the frozen products.

If the frozen product is stored in the freezing compartment the maintenance of such large rooms at so low a temperature is expensive for the temperature must be sufficiently low to insure rapid freezing.

If removed from storage to rooms maintained at a higher temperature, there is the heavy expense of maintaining two sets of rooms, the freezing rooms and the storage room, and the incident transfer and labor cost.

When in the practice of the present methods it is deemed desirable to protect the products, such as fresh meats, as well as possible from air by wrapping the meats in paper or the like, the operation of wrapping the product itself is expensive from the standpoint of the labor and material.

Furthermore, no method of wrapping has been worked out which will fully and completely protect the products against the action of the air, so that there is a considerable loss or deterioration in the goods due to shrinkage, damage, discoloration, etc., which likewise occurs when stored in air without wrapping. For some kinds of merchandise such as poultry, it may be desirable to wrap in water-proofed material and seal the covering so as to exclude the freezing liquid, later referred to, from the product and to proceed with the process as hereinafter set forth.

By my improved process the products are quickly frozen in freezing containers occupying a minimum of space, and involving a minimum of cost, and in such manner that the products to be preserved are completely encased in and protected by a heavy coating of ice which serves to envelope the product while it remains in cold storage.

The products are preferably frozen in molds or cans which are subjected directly to the action of a freezing liquid by which the products are frozen much more quickly and economically than can possibly be attained when performed by freezing in air.

My method comprises placing the products in a container and in spaced relation to the walls of the container, and then taking the necessary steps for the formation of a solid casing or body of ice within the container and surrounding the products.

The sequence of the steps by which this result is obtained may be varied, depending upon the equipment used. When the products have been incorporated as a part of such a body of ice with unbroken, or substantially unbroken faces of ice, on all sides of such body, serving to space the products themselves from the outer faces of the block, such block may be removed from the mold to a storage room where the temperature need be only cool enough to keep the ice from melting.

As a result of the use of my improved process, the products are protected completely from the air, either by being frozen solid in direct contact with the ice forming the block, as will be hereinafter fully disclosed, or within wrappings, in cases where it is deemed desirable to cover the products before freezing. By my process, it is unnecessary to use tierces or other containers.

Being able to freeze the products very rapidly by the tank system, such as used in the formation of artificial ice, the amount of freezing equipment necessary in the way of floor space and piping, etc., is very materially decreased.

The amount of storage room required is reduced. Cured meats may be taken from pickle and frozen promptly when the proper degree of saltiness is attained.

Summarized, the advantages, resulting from my inventions are:

1. No wrapping is necessary.
2. No shrinkage or drying out.
3. No abuse of product from broken edges.
4. The avoidance of excess saltiness of cured meats by providing cheap means to obviate it.
5. No cooperage or packages to purchase.
6. Less labor in all departments.
7. Less cost for producing refrigeration for freezing and storing.
8. Greater storage capacity in an available space.

Other advantages of my improved process will appear in the description hereinafter.

In the drawings:

Fig. 3 is a top view of a mold with still another modified form of spacing means.

Fig. 4 is a top view of a mold with still another modified form of equipment.

Fig. 5 is a cross-sectional view of two molds showing another method of obtaining the desired spacing from the walls of the mold within which the block is frozen into its final form; and Fig. 6 shows details of the submerging means.

Figure 1:
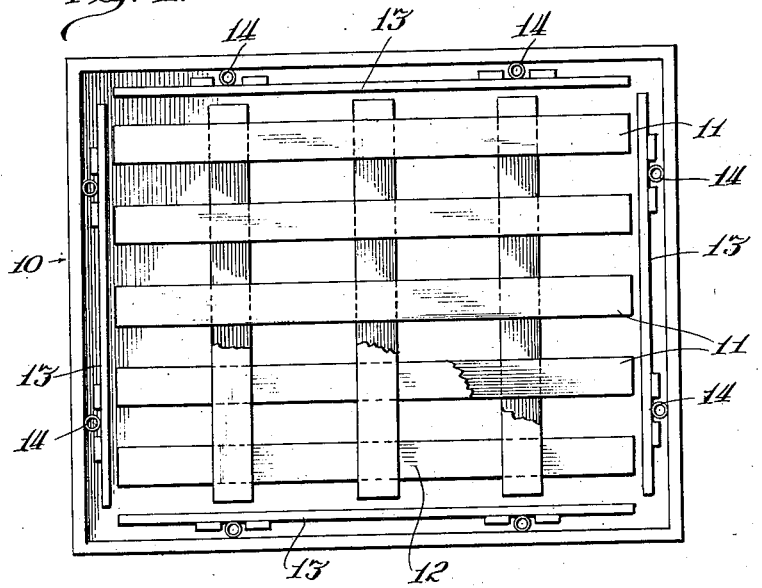
Fig. 1 is a top view of a can or mold equipped with what I now consider the preferred form of means by which the products are spaced from the walls of the mold for the freezing operation.

Referring now to Fig. 1, 10 indicates a mold of any approved type adapted to be immersed in a larger container in which is maintained a body of liquid, at a desired low temperature, as is common in the formation of artificial ice by the tank method.

The container 10 is shown equipped with a plurality of grids, each of which is preferably formed of a number of strips of wood secured together in any suitable manner in the grid form.

In this figure, six grids are shown, comprising a bottom grid 11, a top grid 12, and four side grids 13. The side grids 13 are held in spaced relation with respect to the side walls of the tank by means of spacing devices 14 in the form of tubes which are preferably provided with means at their upper ends for filling with water for the purpose of heating them to facilitate their removal as is hereinafter disclosed.

With the grids 11 and 13 and the spacing devices 14 in place, the space between the grids may be packed with the products to be preserved, the spacing means and grids serving to hold the products away from the walls of the mold. This constitutes what I call the "charge." The products are either placed in the mold without previous preparation, or if desired, they may be placed in cases which can be wrapped with waterproof material so as to keep them dry. When the mold is thus filled or charged, with or without the top grid, the space within the mold and surrounding the "charge" and all "voids" within the charge are filled with freezable liquid, such as water or brine. The mold is then immersed in the refrigerating tank and maintained there until the contents of the container 10 are frozen solid. If brine or unprocessed water is used as the freezable liquid in the container 10, the undesirable solution which collects in the block can be removed at the proper moment, and sufficient liquid added for the completion of the freezing process, as is common in the formation of artificial ice.

After the contents of the mold 10 are frozen solid, the spacing devices 14 are removed by the application of hot water or steam within the tubular devices 14, or in any other suitable manner, and in any suitable manner the block is loosened and removed from the mold.

If desired, the spacing devices 14 can be removed after the exterior of the ice block has sufficiently formed, and the spaces formerly occupied by the spacing devices 14 may then be filled and frozen, whereby an unbroken layer of ice is produced on each of the sides of the block.

The liquid about the grids is frozen into a layer of ice and forms a solid, substantial, and continuous enclosure which serves as a container protecting its contents from external contacts.

Figure 2:
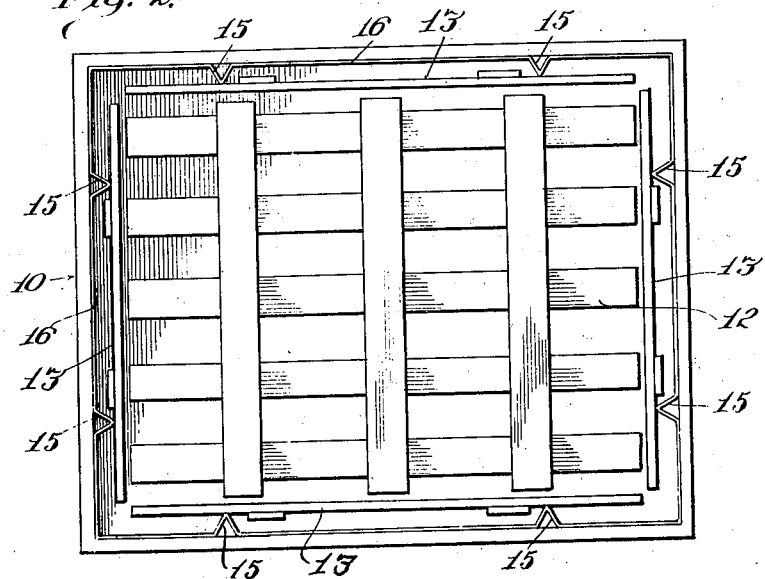
Fig. 2 is a top view of a mold equipped with a modified form of spacing means.

In Fig. 2, the construction is the same, except that the grids are held out of contact with the side walls of the tank 10 by means of inwardly projecting ridges 15 on the faces of the tank walls. In Fig. 2, the ridges 15 are formed on a spacing member 16 which is designed to be kept permanently in position rather than being removable as are the spacing devices 14. Or these spacers may be integral with the walls of the mold.

In Fig. 3, the side grids 13 are dispensed with, and a spacing structure 17 is provided comprising a considerable number of vertical ridges 18, which are designed to space in large measure from the faces of the side walls the products packed in the container 10. As will be readily understood, when the products are frozen into a solid block in the mold 10 of Fig. 3, the products being preserved are spaced more or less completely from the outer faces of the block, but it is evident that at the points of the ridges, at least, the products in the final form of the block are in contact with the air. While this result is not believed to be as perfect as that in connection with the design of Fig. 1, at the same time the method as practiced in connection with the construction of Fig. 3 is believed to be a distinct step in advance of the art as generally practiced.

In Fig. 4, removable tubular spacing devices 19 are employed in lieu of the fixed spacing device 17 of the construction of Fig. 3. The tubular members 19 are preferably triangular in cross section. In the construction of this figure, a bottom spacing device 20 is also substituted in place of the grid 11, as above described, the spacing device 20 comprising a curved tube having a plurality of horizontally extending loops. The tube 20 is preferably provided with means at its ends for connection with a source of hot water whereby it can be readily loosened from the block. In the use of the structure of Fig. 4, it will be understood that the spacing devices 19 can readily be removed after the formation of the outer face of the block. When the space made vacant by such removal of the spacing devices 19 has been filled with a suitable freezable liquid ice will be formed in such spaces, forming an integral part of the block in its completed form.

I also contemplate first packing the perishable products in a smaller tank 21, filling the tank with water or other suitable freezable liquid, about the products, and extending above the products and freezing the same into a solid block 22 with an unbroken layer 23 of ice on its top. After the completion of the block, it can be removed from the tank 21 and placed in position in the tank 10 in spaced relation with respect to the walls of the tank 10 at all points. The tank 10 may then be filled with freeable liquid to surround the block and can very quickly be further frozen, thereby forming unbroken layers of ice on all sides of the block.

I further contemplate forming layers of ice on the inner walls of the tank in any suitable manner to serve as the liners or spacing means as set forth above before placing the perishable products in the tank, as, for example, by freezing water around a form of suitable dimensions mounted or suspended in the tank and then removed. This process may include forming a solid layer of ice also in the bottom of the tank, or if preferred, a layer of broken ice or frost may be provided in the bottom of the tank. As will be readily understood, when the products are packed in the container 10 within the liners or spacing means comprising the surrounding layers of ice as above described, and the freezable liquid is thereafter introduced into the tank about the products, the ice then formed will be merged into a homogeneous body with the layers preliminarily provided, and such layers will be incorporated as integral parts of the completed block.

In all of these operations preferably the known benefits of "sharp" freezing are secured by freezing the block at, say 20° to 50° Fahrenheit below freezing, which by the described procedure can be done at a relatively low expense. Thereafter the frozen block can be kept in storage indefinitely at any temperature desired below freezing.

So far as I am aware, I am the first in the art to freeze perishable products into a solid block by placing the products into a container within means which maintain such products in spaced position with respect to the container walls, then freezing the enclosed products into a solid block like ice closed products into a solid block like ice the unbroken walls of which enclose such products on all sides, and then removing the block from the container and storing it in a refrigerating chamber, and I desire to cover this process broadly, whether the spacing means is in the form of grids, as above described, or whether, on the other hand, the desired spacing is attained by other methods.

By this method, it is possible to pack solidly a mass of perishables, such as meats and the like, within the spacing containers and then surround this mass of packed meats or the like with a relatively thin covering of ice which is yet substantial enough to serve as a container for handling and storage, thus conserving space and ice and minimizing freezing costs.

To hold the charge submerged during the freezing period, I provide, conveniently, a removable bar A, the ends of which are inserted in openings in opposite walls of the container.

This bar is provided with means, such as a thumbscrew B, threaded through the bar A. The thumbscrew is of such length that its threaded end projects below the bar A, so that when sufficiently advanced, its lower end, engaging the top grid or a block on the top grid, will force and hold the top grid below the surface of the freezable liquid in the container.

If desired, the thumbscrew may be backed off before the freezing is completed, and the hole in the ice envelope surrounding the end of the thumbscrew filled with fluid which is then frozen.

I claim:

1. The method of preserving perishable products which comprises placing the material to be preserved in a container, and between spacing means arranged between the products to be preserved and the walls of the container, submerging the material in the container with a freezable liquid, and freezing the contents of the container into a solid block.

2. The method of preserving perishable products which comprises packing the same within enclosing means in a container, filling the container with a freezable liquid to surround the material to be preserved, quickly freezing the contents of the container into a solid block at a relatively low temperature, and then removing the frozen block and storing it in a refrigerating chamber at a relatively high temperature.

3. The method of preserving perishable products which comprises placing the materials to be preserved in a container in fixed spaced relation to the walls thereof, filling the container with a freezable liquid surrounding such material and subjecting the container to a freezing temperature until its contents are frozen solid with substantially unbroken layers of ice on all faces of the frozen block.

4. The method of preserving perishable products which comprises forming such products into a block, placing the block in a container in spaced relation to the side walls, substantially submerging the block in the container with a freezable liquid, and subjecting the container to a freezing temperature serving to encase the block in ice.

5. The method of preserving perishable products which comprises lining a container on its bottom and its side walls with spacing means, placing the materials to be preserved within said spacing means so as to be held away from the walls of the container, submerging the materials in the container with a freezable liquid, and subjecting the container to a freezing temperature until its contents, including the spacing means, are frozen into a solid block with the materials to be preserved spaced inwardly from the outer faces of the block.

6. The method of preserving perishable products which comprises lining a container with removable spacing means, placing the materials to be preserved within and out of contact with the walls of the container, submerging the materials in the container with a freezable liquid and subjecting the container to a freezing temperature until its contents are frozen into a solid block, the process including at some stage the formation of layers of ice including the spacing means which means serve in the final form of the block to hold the material to be preserved within the outer faces of the block.

7. The method of preserving perishable products which comprises positioning spacing means along but away from the inner walls of a container, placing the materials to be preserved between said spacing means so as to be held substantially away from the walls of the container, filling the container with a freezable liquid, freezing the contents of the container into a solid block, removing the means for positioning the spacing means, substantially filling with a freezable liquid the spaces formerly occupied by the positioning means, and then freezing the added liquid to form an integral part of the solid block.

8. The method of preserving perishable products which comprises lining a container on its bottom and side walls with spacing means adapted to be incorporated as parts of a frozen block, placing the material to be preserved in said container so as to be held away from the walls of the container by the spacing means, substantially filling the container with a freezable liquid, and subjecting the container to a freezing temperature until its contents are frozen solid with the ice formed from the freezable liquid merged with the spacing means into substantially unbroken walls.

9. The method of preserving perishable products which comprises lining a container with spacing members which are held in spaced relation to the faces of the container, placing the materials to be preserved in the space enclosed by said spacing members, substantially filling the container with a freezable liquid, and subjecting the container to a freezing temperature until its contents are frozen solid with substantially unbroken walls of ice on the outer faces of the frozen block.

10. The method of preserving perishable products which comprises lining a container with grids, placing the material to be preserved in the space enclosed by the grids, filling the container with a freezable liquid to a point above the materials, and subjecting the container to a freezing temperature until its contents are frozen solid with the grids and the intervening ice forming unbroken walls serving to space the material to be preserved from the outer faces of the block.

11. The method of preserving perishable products which comprises lining a container with grids, with positioning devices interposed between the grids and the walls of the container, placing the material to be preserved in the space enclosed by the grids, substantially filling the container about the material to be preserved and about the grids with a freezable liquid, and subjecting the container to a freezing temperature until its contents are frozen solid with substantially unbroken walls of ice on the outer faces of the frozen block.

12. The method of preserving perishable products which comprises lining a container with grids, with positioning devices interposed between the grids and the walls of the container, placing the material to be preserved in the space enclosed by the grids, submerging the material in the container with a freezable liquid, subjecting the container to a freezing temperature until the contents are frozen solid with substantially unbroken walls of ice on the outer faces of the frozen block, removing the positioning devices, and then removing the block from the container.

13. The method of preserving perishable products which comprises lining a container with grids, with positioning devices interposed between the grids and the walls of the container, placing the material to be preserved in the space enclosed by the grids, substantially filling the container with a freezable liquid, subjecting the container to a freezing temperature until its contents are frozen solid with substantially unbroken walls of ice on the outer faces of the frozen block, removing the positioning devices, filling with a freezable liquid the space left vacant by the removal of the positioning devices, and then subjecting the container to a freezing temperature until such added liquid is frozen.

14. The method of preserving perishable products which comprises placing the same in a container provided with positioning devices arranged at intervals about the side walls of the container for holding the products away from the faces of the walls of the container, substantially surrounding the products in the container with a freezable liquid, and subjecting the container to a freezing temperature until its contents are frozen solid.

15. The method of preserving perishable products which comprises placing the same in a container provided with positioning devices arranged at intervals about the side walls of the container for holding the products away from the faces of the walls of the container, substantially surrounding the products in the container with a freezable liquid, subjecting the container to a freezing temperature until its contents are frozen substantially solid, then removing the positioning devices, filling with a freezable liquid the space left vacant by the removal of the positioning devices, and finally subjecting the container again to a freezing temperature until the added liquid is frozen.

16. A storage block comprising a perishable product, enclosed within removable enclosing means, the whole frozen into a solid block with unbroken enclosing walls of ice.

17. A storage block comprising a perishable product enclosed within a plurality of grids, all frozen into a solid block with unbroken enclosing walls of ice.

DAVID I. DAVIS.